(12) United States Patent
Laker et al.

(10) Patent No.: US 8,333,859 B2
(45) Date of Patent: *Dec. 18, 2012

(54) EFFICIENT LAMINATION PRESS WITH RADIANT HEATING

(75) Inventors: Matthew B. Laker, West Valley City, UT (US); Raymond L. Goodson, Sandy, UT (US)

(73) Assignee: 3form, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/054,059

(22) PCT Filed: Jul. 22, 2009

(86) PCT No.: PCT/US2009/051396
§ 371 (c)(1),
(2), (4) Date: Jan. 13, 2011

(87) PCT Pub. No.: WO2010/011742
PCT Pub. Date: Jan. 28, 2010

(65) Prior Publication Data
US 2011/0120639 A1     May 26, 2011

Related U.S. Application Data

(60) Provisional application No. 61/082,767, filed on Jul. 22, 2008.

(51) Int. Cl.
*B32B 37/00* (2006.01)
(52) U.S. Cl. ........ 156/228; 156/498; 156/499; 156/581; 156/583.3
(58) Field of Classification Search .................. 156/228, 156/311, 498, 499, 580, 581, 583.1, 583.3
See application file for complete search history.

(56) References Cited

U.S. PATENT DOCUMENTS

| 1,549,619 | A |   | 8/1925 | Steenstrup |
|-----------|---|---|--------|------------|
| 2,371,847 | A | * | 3/1945 | Saunders et al. ............... 156/291 |
| 3,029,178 | A |   | 4/1962 | Carver |
| 3,376,808 | A |   | 4/1968 | Beckett |
| 3,950,210 | A |   | 4/1976 | Gibbs |

(Continued)

FOREIGN PATENT DOCUMENTS

EP      1293271      3/2003

(Continued)

OTHER PUBLICATIONS

International Search Report and Written Opinion on PCT/US09/51396, mailed Sep. 16, 2009.

(Continued)

*Primary Examiner* — James Sells
(74) *Attorney, Agent, or Firm* — Workman Nydegger

(57) ABSTRACT

An efficient lamination presses can rapidly heat and precisely control the temperature of a laminate assembly to create final products with excellent structural and aesthetic properties. Specifically, an efficient lamination press can include a radiant heating assembly. The radiant heating assemblies can uniformly heat one or more platens using radiation. The platens in turn can comprise material having a high thermal conductivity, which can allow them to quickly transfer heat to a laminate assembly. The platens can further comprise one or more fluid channels that enable rapid cooling. The rapid heating and cooling capability can enable fast processing times for laminate panels at much lower energy levels than with conventional presses.

19 Claims, 5 Drawing Sheets

U.S. PATENT DOCUMENTS

| | | | |
|---|---|---|---|
| 4,217,157 A | | 8/1980 | Stoltze |
| 4,311,549 A | | 1/1982 | Vercillo |
| 4,421,589 A | | 12/1983 | Armini |
| 4,715,923 A | | 12/1987 | Knoll |
| 4,923,560 A | | 5/1990 | Inselmann |
| 5,112,431 A | | 5/1992 | Gerhardt |
| 5,562,028 A | * | 10/1996 | Bielfeldt et al. ............. 100/311 |
| 5,589,026 A | | 12/1996 | Pereeman |
| 5,611,269 A | * | 3/1997 | Bielfeldt ....................... 100/311 |
| 5,628,845 A | | 5/1997 | Murray |
| 5,635,014 A | | 6/1997 | Taylor |
| 6,030,474 A | | 2/2000 | Isono |
| 2005/0056363 A1 | | 3/2005 | Takeyama |

FOREIGN PATENT DOCUMENTS

EP 1803547 4/2007

OTHER PUBLICATIONS

International Search Report and Written Opinion on PCT/US09/51425, mailed Oct. 15, 2009.
EPO Search Report and Opinion on Application No. EP 09800937.6 (Mailed Dec. 23, 2011).
EPO Search Report and Opinion on Application No. EP 09800952.5 (Mailed Dec. 23, 2011).

* cited by examiner

EFFICIENT LAMINATION PRESS WITH RADIANT HEATING

CROSS-REFERENCE TO RELATED APPLICATIONS

This application is a U.S. National Stage Application of PCT Application No. PCT/US09/51396, filed on Jul. 22, 2009, entitled "Efficient Laminate Press with Radiant Heating," which claims the benefit of priority to U.S. Provisional Application No. 61/082,767, filed Jul. 22, 2008, entitled "Lamination Press." The entire content of each of the aforementioned patent applications is incorporated by reference herein.

BACKGROUND OF THE INVENTION

1. The Field of the Invention

The present invention relates generally to presses for forming laminated products.

2. Background and Relevant Art

Laminate panels have a wide utility in design and architectural applications, including use as walls, partitions, lighting fixtures, displays, etc. Laminate panels using resin materials are popular because they tend to be less expensive than materials such as glass or the like, in many applications where certain structural, optical, and aesthetic characteristics are desired. In addition, laminated resin materials tend to be more flexible in terms of manufacture and assembly, since resin materials are relatively easy to bend, mold, color, shape, cut, and modify in many different ways. One particularly popular technique is to embed decorative layers, such as, for example, fabrics, paper, colored films, printed images, or three-dimensional objects (grass, reed, rocks, flowers, metal, etc.) between translucent resin sheets. These and other resin panels are often produced using heated lamination, which involves the application of pressure and heat to at least partially melt the resin sheets to each other to form a final resin panel product.

Conventional lamination technology, however, can lead to panel damage or imperfections, and can introduce significant overhead and inefficiency into the resin panel production process, as explained in greater detail below. In most conventional lamination processes, a component press applies heat and pressure to a stack of sheets of material (often called a layup stack, sandwich, or a book) to join the sheets together. A second component press then cools the sheets under pressure to form a resulting unitary product. In conventional lamination operations, it is necessary to control the pressing, heating, and cooling of the laminate assembly to ensure proper fusing and the minimization of flaws and stresses in the resulting product.

To press a laminate assembly together, conventional lamination presses use large, heavy cast iron platens. In particular, pistons, hydraulic cylinders, or apparatus act on finite contact points on platens to actuate and press the platens together. Pressure applied to finite contact points can bend, warp, or otherwise deform the platens over time. These imperfections can produce inconsistent pressure along the surface(s) of the layup stack, which often results in finished products having an inconsistent gauge, waves, or other deformities. Additionally, normal use can scratch, dent, or otherwise damage the surface of the platens, which can lead to similar corresponding surface damage in products formed by such platens.

One potential solution for damaged platens is to simply replace them. Unfortunately, the material, size, and construction of conventional platens make replacement extremely expensive and otherwise impracticable. Thus, manufacturers typically use tooling plates and/or pressure pads between the laminate assembly and the platens to compensate for any deformities in the platens. The tooling plates and pressure pads can help provide smooth surfaces and produce more uniform distribution of pressure across a layup stack. The use of tooling plates and pressure pads, however, also decreases the efficiency of the lamination processes and increases processing times. In particular, manufacturers must spend time and effort to position any tooling plates and pressures pads. Furthermore, the additional layers between the platens and laminate assembly reduce the heat transfer rate to the layup stack, and thus, require additional heat, time, and cost.

In addition to the foregoing, conventional pressing processes can create various drawbacks specific to the materials being processed. For example, when embedding three-dimensional objects within resin sheets traditional pressing processes can smashes or otherwise deform the three-dimensional objects. In particular, traditional presses can concentrate a disproportionate amount of pressure on a few of the three-dimensional objects as the resin sheets begin to melt, thereby producing a flawed final product. To avoid this, manufacturers often apply increasing amounts of heat and/or pressure in steps to help ensure the resin sheets melt and form around the three-dimensional objects instead of crushing them. Such stepped processes, however, can significantly increase processing times and overall process overhead.

In addition to the various drawbacks of conventional pressing processes, the heating processes of conventional lamination presses can also present various drawbacks and inefficiencies. Conventional presses often heat the platens by passing hot oil or steam through serpentine fluid channels formed in the platens. In either case, such heating methods typically require large boilers and plumbing systems, which are both large and relatively immobile. Furthermore, hot oil is both an environmental hazard and a safety concern for workers. Similarly, steam can present a safety concern for workers as it must be brought to relatively high pressures to have the temperature necessary to heat the platens.

Conventional platens are usually made of cast iron for its heat retention capabilities and for its manufacturability, which allows for the creation of the serpentine fluid channels. The cast iron construction of the platens, however, tends to make precise temperature control difficult, requiring significant time and energy to heat or cool the platens to a desired temperature. For this reason, manufacturers often use a "hot" component press and a separate "cold" component press. The use of two component presses allows the manufacturer to maintain both presses at a desired temperature, and avoid the time and energy required to change the platen temperature.

The time and effort needed to transfer the layup stacks from the hot component press to the cold component press, however, increases production time, creates the potential for damaging the materials, and otherwise adds inefficiency to the lamination process. Furthermore, in such cases the manufacturer will often maintain the heat of the hot component press for extended periods of time, even between jobs. Heating or maintaining the temperature of the hot component press between jobs, by itself, can lead to significant costs.

Even when using separate hot and cold presses, a manufacturer will often still need to adjust the temperature of a given hot or cold component press depending on the type and gauge of the material being processed. For example, if the manufacturer needs to process both ¼ inch and ½ inch gauge panels, the manufacturer may first adjust the temperature of the press for one gauge, such as the ¼ inch panels. After processing the ¼ inch panel, the manufacturer may then adjust the temperature for the ½ inch gauge panels. As mentioned previously, when using conventional lamination presses, such temperature adjustments tend to be difficult to determine and maintain with precision. Thus, if a site regularly processes a variety of different panel gauges or materials, the time and energy associated with these temperature adjustments can lead to significant manufacturing inefficiency.

Additionally, the cooling processes of conventional lamination presses can add even further inefficiencies and drawbacks to the lamination process. For example, conventional platens are often cooled by running cold water or air through serpentine fluid channels formed in the platens. Uniform cooling of conventional platens can be problematic, however, because the introduction of low temperature cooling fluids into the fluid channels of the platens often cools the platen much faster at the inlet than the outlet. This can prevent portions of the laminate assembly from properly cooling, require longer cooling time, or otherwise add inefficiencies.

Thus, conventional presses typically require significant front-end work, including a great deal of energy and labor. For example, typical cycles (combined pressing, heating, and cooling) for a given decorative resin panel using conventional lamination presses are (in best case scenarios) typically about thirty minutes or more. Such processing times do not include any time required to change the temperature of a press based on the material or gauge of the panel being processed. In addition, such operation cycles often require at least six to eight people.

Furthermore, as noted above both the pressing and heating systems of conventional press can make the presses relatively large and heavy (in some cases conventional presses can weigh several tons). This makes many conventional presses effectively immobile.

BRIEF SUMMARY OF THE INVENTION

Implementations of the present invention comprise systems, methods, and apparatus for applying heat and pressure to a laminate assembly with increased efficiency, while still producing final products with excellent structural and aesthetic properties. In particular, implementations of the present invention comprise apparatus that can decrease lamination process times by providing rapid and uniform heating and cooling. Additionally, implementations of the present invention comprise apparatus that quickly and efficiently process laminate assemblies, while requiring less energy and labor than conventional lamination processes.

For example, one implementation of a lamination press configured to rapidly heat and precisely control the temperature of a laminate assembly using radiant heating can include first and second platens each including a plurality of fluid channels extending there through. Additionally, the lamination press can include one or more radiant heating assemblies configured to heat the first and second platens. The lamination press can further include an actuator configured to press one or more of the first and second platens toward the other of the first and second platens.

Also, an implementation of press component for use in an efficient lamination press configured to rapidly heat and uniformly press a laminate resin assembly with radiant heating to form a decorative architectural resin structure can comprise a fluid-tight enclosure comprising a housing and a platen having a plurality of fluid channels. The press component can also include one or more radiant heating elements positioned within the fluid-tight enclosure between the housing and the platen.

Furthermore, an implementation of a method for rapidly and uniformly heating a laminate assembly with radiation to form a unitary product can involve placing a laminate assembly between opposing platens. The method can also involve radiating heat about the opposing platens, thereby uniformly heating the laminate assembly. Additionally, the method can involve actuating one or more of the opposing platens to uniformly press the laminate assembly between the opposing platens. The method can further involve cooling the opposing platens by pumping a cooling medium through a plurality of fluid channels formed within the opposing platens.

In addition to the foregoing, an implementation of a method of rapidly forming a decorative architectural resin panel in a lamination press at low pressures can involve positioning a laminate assembly within a lamination press. The method can also involve applying continuous pressure of between about 5 pounds per square inch and about 40 pounds per square inch to the laminate assembly. The method can additionally involve heating the laminate assembly at a desired temperature while maintaining the continuous pressure to at least partially melt and form one or more resin sheets of the laminate assembly as a substantially unitary resin panel structure. The method can also involve cooling the unitary resin panel while maintaining the continuous pressure.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
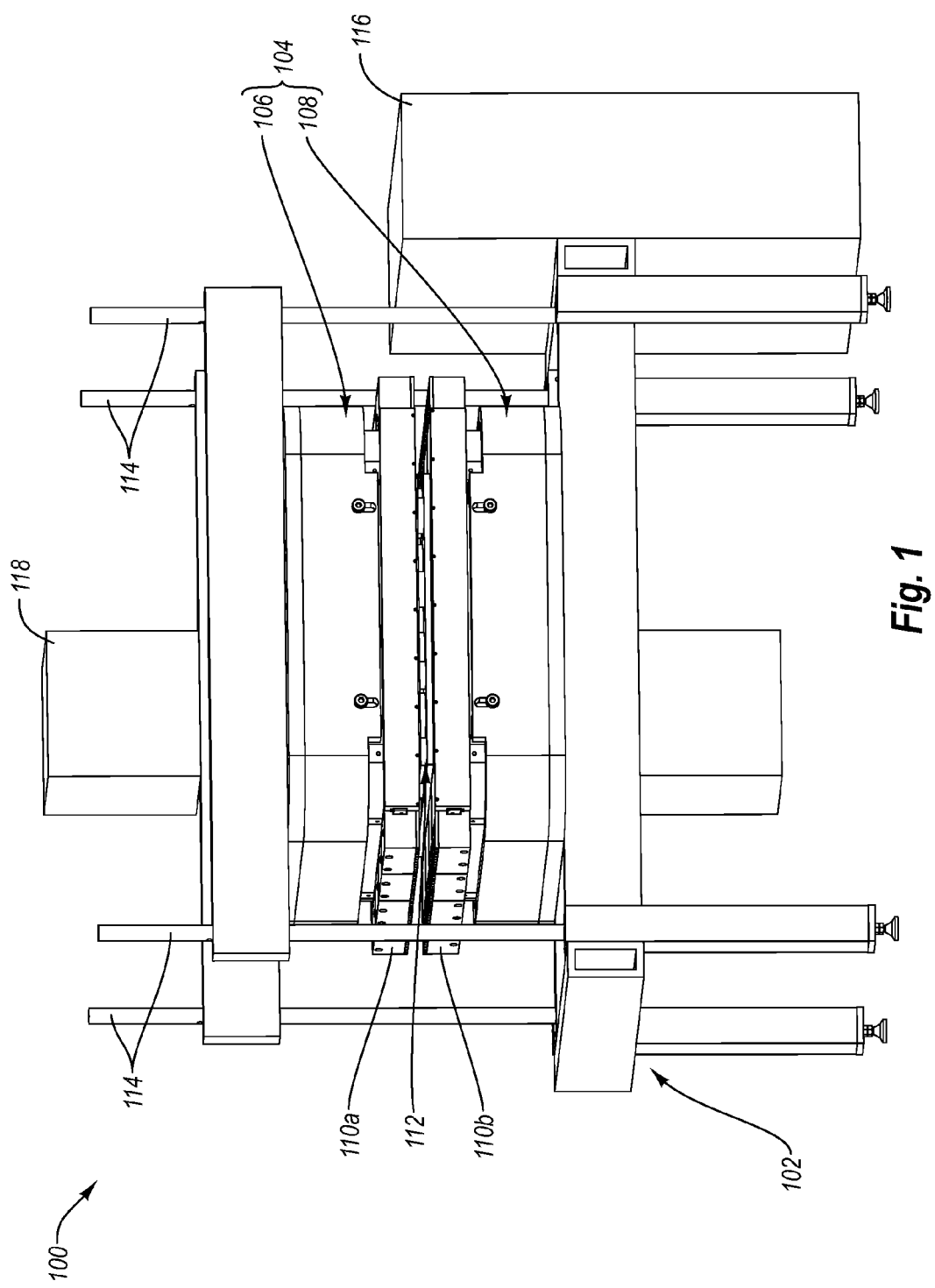
FIG. 1 illustrates a perspective view of a lamination press in accordance with an implementation of the present invention.

The present invention relates to systems, methods, and apparatus for applying heat and pressure to a laminate assembly with increased efficiency, while still producing final products with excellent structural and aesthetic properties. In particular, implementations of the present invention comprise apparatus that can decrease lamination process times by providing rapid and uniform heating and cooling. Additionally, implementations of the present invention comprise apparatus that quickly and efficiently process laminate assemblies, while requiring less energy and labor than conventional lamination processes.

More specifically, one or more implementations of the present invention include a lamination press that uses radiated heat from one or more heating elements to efficiently heat one or more opposing platens. One will appreciate in light of the disclosure herein that by using radiant heating, the lamination press can rapidly and precisely heat a laminate assembly, and thereby, increase heat transfer efficiency, reduce the power requirements, and reduce the processing times. Additionally, the lamination press can reduce or eliminate "hot spots", and otherwise uniformly heat a laminate assembly.

Furthermore, the use of radiant heating can eliminate the need for large infrastructure, such as boilers and plumbing systems, to heat the lamination press. For example, a radiant lamination press may require only electricity for heating the platens. The combination of reduced size, weight, and need for infrastructure can allow one or more implementations of a lamination press of the present invention to be easily moved. This can provide an appreciable advantage and provide a manufacturing facility with great flexibility.

Efficient lamination presses with radiant heating can also be environmentally friendly. For example, the reuse of radiant heaters can eliminate the need for hazardous oil and related environmental concerns. Furthermore, one or more radiant-heating lamination presses can process large resin panels using between 10 to 20 percent of the power required by many conventional lamination presses due to ability to rapidly and precisely heat and cool the lamination press.

As an initial matter, implementations of the present invention are described herein below primarily with reference to processing of decorative resin panels. One will appreciate, however, that panels, particularly resin-based panels, are only one type of product that the apparatus, systems, and methods of the present invention can produce. For example, one or more implementations of the present invention can process not only resin "panels," as such, but also glass panels. Furthermore, one will appreciate that one or more implementations of the present invention can also process other types of structures having different material compositions, such as objects comprising wood, stone, fiberglass, or the like, which may or may not exhibit primarily panel-like dimensions as described herein. Such structures can include, for example, circuit boards, films, fabrics, etc. Reference herein, therefore, to panels, or even resin panels, as such, is primarily for convenience in description.

Accordingly, and as will be understood more fully from the following specification and claims, at least one implementation of the present invention includes a lamination press having a press assembly configured for pressing, heating, and cooling layers of resin material. For example, FIG. 1 illustrates a perspective view of a lamination press 100 according to an implementation. As shown in FIG. 1, the lamination press 100 can include a frame 102 for supporting or mounting one or more press assemblies 104. For instance, FIG. 1 shows that the lamination press 100 can include at least one press assembly 104 having an upper press component 106 and a lower press component 108. The upper press component 106 can include an upper platen assembly 110a. Similarly the lower press component 108 can include a lower platen assembly 110b.

As described in more detail herein, the lamination press 100 can apply heat and pressure to a laminate assembly 112 to form a unitary product. As used herein, the term "laminate assembly" refers to two or more layers of material that a press can at least partially form together through the application of heat and pressure. For example, a laminate assembly 112 can include a first resin sheet, a decorative image layer (e.g., films, botanicals, inorganic materials, fabrics, etc.), and a second resin sheet. In other cases, the laminate assembly 112 may also or alternatively comprise a substrate (e.g., a resin or glass sheet), and an adjacent decorative image layer, or a pair of substrates (e.g., a plurality of resin and/or glass sheets) with no additional image layer, or perhaps only a film layer.

In any case, the upper and lower press components 106, 108 can apply pressure to a laminate assembly 112 by pressing the upper and/or lower platen assemblies 110a, 110b together, about the laminate assembly 112. While the upper and lower platen assemblies 110a, 110b are pressing the laminate assembly 112 together, a radiant heating source can heat the upper and/or lower platen assemblies 110a, 110b, and thus the laminate assembly 112, to cause the layers of the laminate assembly 112 to at least partially form together. Additionally, a cooling source can then cool the upper and lower platen assemblies 110a, 110b, and thus the laminate assembly 112, to form a unitary product.

As FIG. 1 illustrates, in one or more implementations, the upper and lower press components 106, 108 are identical, and are mounted to the frame 102 in mirrored positions relative to one another. Furthermore, a manufacturer can selectively move the upper press component 106 and/or the lower press component 108 relative to the frame 102 to open the press assembly 104. In other words, the lamination press 100 can allow a manufacturer to increase the space between the upper and lower press components 106, 108 to allow placement, positioning, and removal of a laminate assembly 112.

In at least one implementation, for example, the frame 102 can include a scissor lift (not shown), which a manufacturer can manipulate to raise or lower one or more of the press components 106, 108 relative to each other. Additionally, FIG. 1 shows that the frame 102 can alternatively include a plurality of supports 114 along which a manufacturer can slide and selectively lock the upper 106 and/or lower press component 108 to open and close the press assembly 104. In alternative or additional implementations, the frame 102 can include a hinge assembly about which a manufacturer can pivot the upper press component 106 to open the press assembly 104.

Furthermore, the lamination press can include a rail or slide system that allows a manufacturer to pull the lower press component 108 out from underneath the upper press component 106. By pulling the lower press component 108 out from underneath the upper press component 106, the manufacturer can provide sufficient space to allow layup and placement of a laminate assembly 112 directly on the lower platen assembly 110b. By laying up the laminate assembly 112 directly on the lower platen assembly 110b, the manufacturer can increase processing speed by eliminating the need for layup tables, transfer trays, and other mechanisms often used to transfer and load pre-assembled laminate assemblies 112 into a lamination press 100.

In addition, FIG. 1 illustrates a lamination press 100 having a single press assembly 104. Thus, the lamination press 100 depicted in FIG. 1 has the capability to process a single laminate assembly 112 (or a single group of combined layup stacks 112) at a time. The present invention, however, is not so limited. For example, according to one or more implementations the lamination press 100 can include a plurality of press assemblies 104 that permits the lamination press 100 to process a plurality of layup stacks 112 (or a plurality of groups of layup stacks 112) concurrently.

In particular, the lamination press 100 can include a plurality of vertically or horizontally stacked or aligned press assemblies 104. One will appreciate that, in such implementations, a manufacturer can stagger the processing cycles of each press assembly 104 to increase processing efficiency and reduce labor. For instance, when the lamination press 100 includes two press assemblies 104, the manufacturer can assemble and position a laminate assembly 112 in a first press assembly 104, while a second press assembly 104 is pressing, heating, and cooling another laminate assembly 112. Once the second press assembly 104 is done forming a unitary product, the manufacturer can assemble and position another laminate assembly 112 therein, while the first press assembly 104 is processing its layup stack.

Figure 2A:
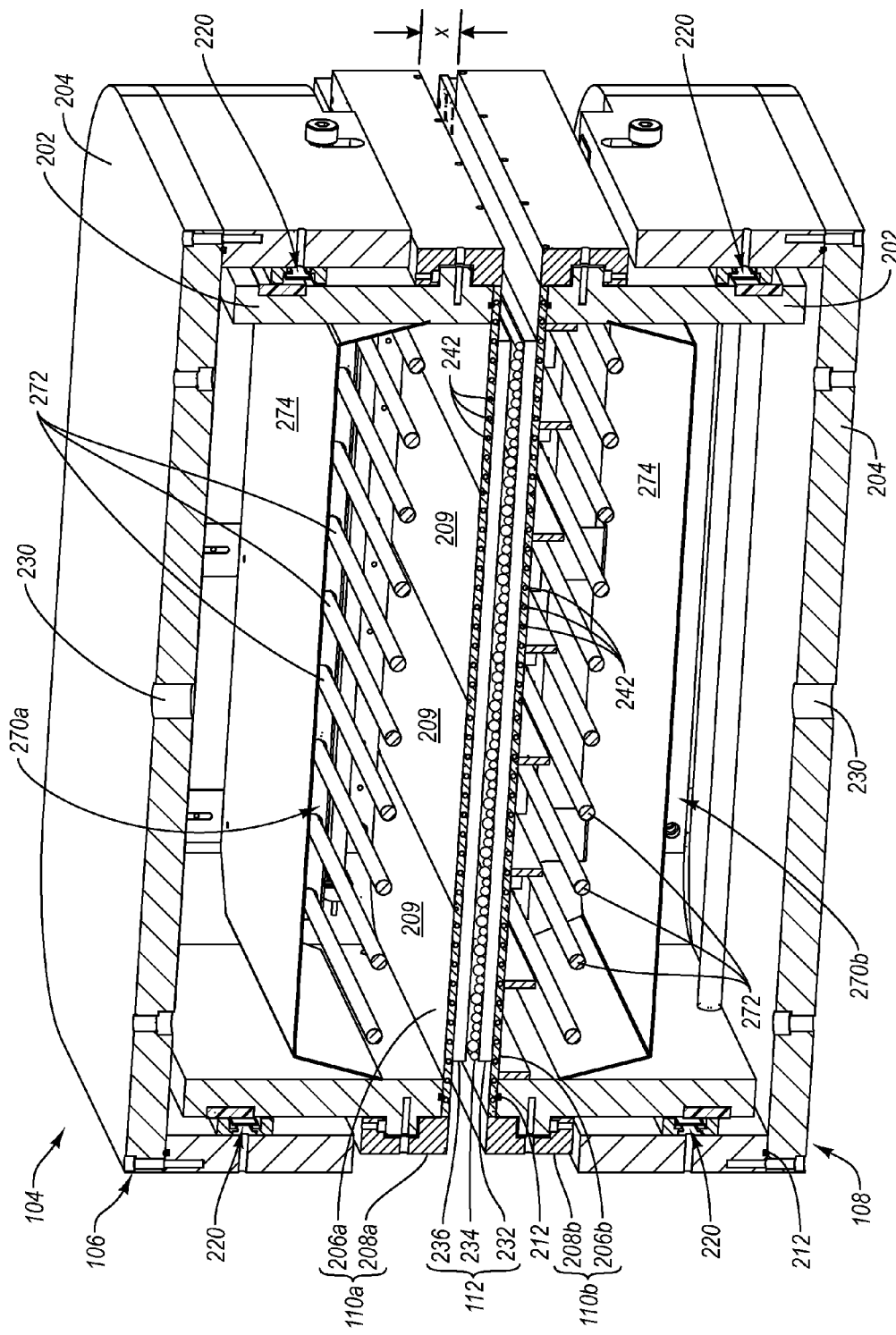
FIG. 2A illustrates a side perspective, cross-sectional view of a press assembly of the lamination press of FIG. 1 in a refracted configuration in accordance with an implementation of the present invention.

As previously mentioned, the lamination press 100 can rapidly and precisely heat and/or adjust the temperature of the upper and lower platen assemblies 110a, 110b using radiant heating. For example, FIG. 2A illustrates a side perspective, cross-sectional view of the press assembly 104 of the lamination press 100 in an un-actuated or contracted configuration. As shown by FIG. 2A, the upper press component 106 and the lower press component 108 can each include an inner housing 202 movably coupled to an outer housing 204.

FIG. 2A also illustrates that of the upper platen assembly 110a can include a first platen 206a coupled thereto by a frame assembly 208a. Similarly, the lower platen assembly 110b can include a second platen 206b coupled thereto by a frame assembly 208b. Additionally, FIG. 2A shows that the first and second platens 206a, 206b (hereinafter referred together as "platens 206") can comprise a plurality of fluid channels 242 for use in cooling and/or heating the platens 206, as explained in greater detail below.

Additionally, as previously mentioned, the press assembly 104 can include one or more radiant heating assemblies for heating and otherwise controlling the temperature of the platens 206. For example, FIG. 2A illustrates that in one or more implementations, each of the upper press component 106 and the lower press component 108 can include first and second radiant heating assemblies 270a, 270b, respectively.

FIG. 2A further illustrates that the first and second radiant heating assemblies 270a, 270b can each include a plurality of radiant heating elements 272. According to one or more implementations, the radiant heating elements 272 can comprise infrared heaters. For instance, the radiant heating elements 272 can comprise radiation heaters, such as, for example, quartz heating elements, ceramic infrared heating elements, or metal sheathed infrared heaters. As shown in FIG. 2A, in at least one implementation, the plurality of radiant heating elements 272 can comprise halogen lamps.

In any event, the radiant heating elements 272 can heat the platens 206 through radiation instead of conduction, convection, or combinations thereof. By heating the platens 206 using radiant heating, the first and second radiant heating assembly 270a, 270b can help reduce or eliminate "hot spots" and "cold spots" by exposing at least the majority of each platen 206a, 206b equally to radiation. Thus, according to one or more implementations, the first and second radiant heating assemblies 270a, 270b can uniformly or substantially uniformly heat the platens 206, and thus, a laminate assembly 112.

Figure 3:
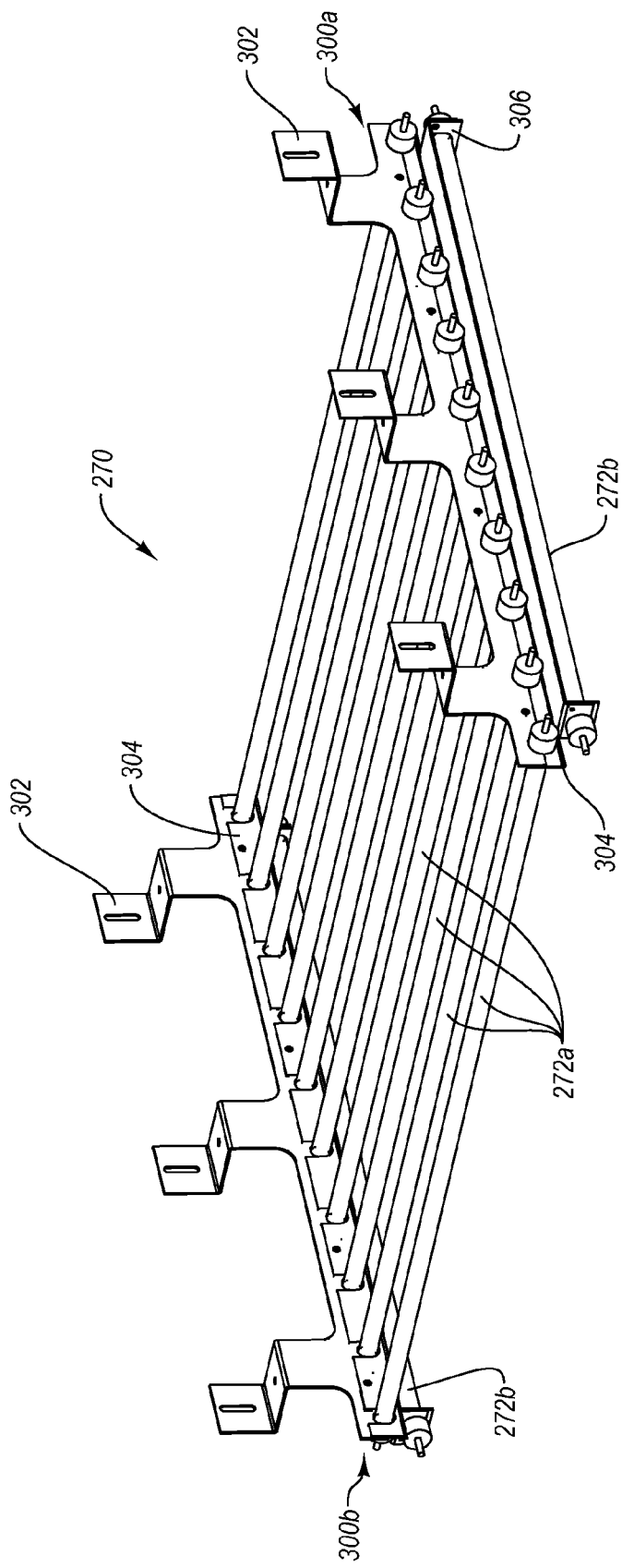
FIG. 3 illustrates a top, perspective view of a radiant heating assembly in accordance with an implementation of the present invention.

FIG. 3 shows a perspective view of a radiant heating assembly 270. FIG. 3 illustrates that a manufacturer can configure the radiant heating elements 272 to aid in the diffusion of heat within the inner housing 202, and thus, aid with the uniform or substantially uniform heating of the platens 206. For example, the heating assembly 270 can include a plurality of heating elements 272a running parallel to each other. Additionally, the manufacturer can evenly space the parallel radiant heating elements 272a at an optimal distance based on the dispersion capabilities of the parallel radiant heating elements 272a. Furthermore, according to at least one implementation, the heating assembly 270 can also include one or more perpendicular radiant heating elements 272b running along each end of the parallel radiant heating elements 272a. The perpendicular radiant heating elements 272b can help compensate for any dead band that the parallel radiant heating elements 272a may otherwise have along their edges, and can thus aid in the uniform distribution of heat across the platens 206.

FIG. 3 further illustrates that the radiant heating assembly 270 can include a pair of mounting assemblies 300(a, b) for securing the radiant heating elements 272 within upper and lower press components 106, 108. The mounting assemblies 300(a, b) can space the radiant heating elements 272 from each other and from the platens 206. Furthermore, in one or more implementations, the mounting assemblies 300(a, b) can include the ability to compensate for any expansion and contraction of the individual radiant heating elements 272 during the heating and cooling processes.

For example, the mounting assemblies 300(a, b) can each include an upper bar 302 and a lower bar 304. The lower bars 304 can directly support the bottom surface of the plurality of parallel radiant heating elements 272a. The upper bars 302 in turn can couple the lower bars 304 to a press component 106, 108 (FIG. 2A). A manufacturer can configure the connection between the upper bars 302 and the lower bars 304 to provide a space therebetween to allow the parallel radiant heating elements 272a to expand and contract without restriction. Similarly, a bar 306 can support the bottom surface of the perpendicular radiant heating elements 272b and connect them to the lower bars 304 with sufficient space to allow for expansion and contraction.

Referring again to FIG. 2A, the plurality of radiant heating elements 272 can emit energy through radiation, which is then absorbed by the platens 206(a, b) and transferred to a laminate assembly 112. One will appreciate in light of the disclosure herein that the press components 106, 108 can include various features and materials to uniformly direct the radiation from the radiant heating elements 272 toward the platens 206. For example, according to one or more implementations, the inner housings 202 can include a reflective ceramic material to aid in the diffusion of heat within the press components 106, 108. Additionally, FIG. 2A illustrates that the first and second radiant heating assemblies 270a, 270b can include reflector plates 274 to direct heat emitted by the radiant heating elements 272 away from the outer housings 204 and toward the platens 206. Alternatively, the inner surfaces of the outer housings 204 can act as reflector plates and direct heat toward the platens 206.

Furthermore, a manufacturer can configure the platens 206 to have the ability to efficiently absorb the heat emitted by the radiant heating elements 272 and rapidly transfer it to the laminate assembly 112. For example, the platens 206 can comprise a material having a high thermal conductivity, which can allow for the rapid transfer of heat. For example, the platens 206 can comprise copper, aluminum, a similarly conductive metal or composite, and/or mixtures or alloys thereof. One will appreciate in light of the disclosure herein that some such materials can have a thermal conductivity of approximately five times or more that of cast iron. In addition to allowing for rapid heating, the highly thermally conductive material of the platens 206 can also allow for rapid cooling and rapid changes in temperature.

In addition, a manufacturer can apply a material to a surface of the platens 206 in order to create a highly absorptive surface with low reflectivity/low emissivity. In an implementation of the present invention, for example, the manufacturer can coat the platens 206 with black chrome due to its ability to increase energy absorption. Such a highly absorptive surface can facilitate quick and efficient heating of the platens 206a, particularly when the platens 206 comprise a material with a high thermal conductivity, such as aluminum.

In addition to the material, the platens 206 can have a relatively small thickness, which can allow the first and second radiant heating assemblies 270a, 270b to rapidly heat the platens 206. Indeed, according to one or more implementations, the platens 206 can each have a thickness of between about ⅛ inch and about ½ inch. The relatively small thickness of the platens 206 can allow them to rapidly absorb heat from the plurality of radiant heating elements 272 and conduct it into the laminate assembly 112. Furthermore, the relatively small thickness of the platens 206 can allow the platens 206 to rapidly cool or otherwise change temperature.

Thus, the radiant heating elements 272 can work in conjunction with the high thermal conductivity of the platens 206 to allow for rapid heating of the platens 206 and a laminate assembly 112. In particular, this combination can rapidly heat the platens 206 to desired temperature and with greater precision than is generally possible with conventional presses. These heating abilities, when combined with the ability to quickly cool the platens 206, can allow a single press assembly 104 to both heat and cool a laminate assembly 112 quickly and efficiently.

In one or more implementations of the present invention, a cooling source 118 (FIG. 1) can cool the platens 206 by passing a cooling medium (water, glycol, air, or similar fluids) through the fluid channels 242. For example, a pump 118 can cool the platens 206 by pumping cold water through the fluid channels 242. One will appreciate in light of the disclosure herein that the high thermal conductivity and the smaller thickness of the platens 206 can similarly allow for rapid cooling, just as it allows for rapid heating.

Furthermore, to increase the cooling speed of the platens 206, the cooling source 118 can pass the cooling medium in both directions across the platens 206. For example, the cooling source 118 can pump a cooling medium through one half of the fluid channels 242 in a first direction, and can pump a cooling medium through the other half of the fluid channels 242 in a second opposing direction. The cross flow of the cooling medium can increase the cooling speed of the platens 206. Furthermore, the cross flow of cooling medium can help prevent one side or area of the platens 206 from cooling quicker than the other.

Additionally, to speed up the heating process after a cooling cycle, the cooling source 118 can pass air through the fluid channels 242 to purge any cooling medium from the fluid channels 242. The purging of any cooling medium from the fluid channels 242 can speed up the subsequent heating of the platens 206 by eliminating the need to boil the cooling medium from the fluid channels 242. Additionally, purging the fluid channels 242 with air prior to heating the platens 206 can help keep the fluid channels 242 clean and prevent the build up of residue over time.

Thus, according to at least one implementation, the upper and lower press component 106, 108 can comprise fluid-tight enclosures or boxes. For example, each of the press components 106, 108 can include one or more seals 212 within the interfaces between the inner housings 202, the outer housings 204, upper and lower platen assemblies 110a, 110b, and their component parts. The seals 212 can prevent fluid from escaping or entering the press components 106, 108. Additionally, because the upper and lower press components 106, 108 are fluid-tight, the fluid actuator 116 (FIG. 1) can regulate a quantity of fluid within the upper and lower press components 106, 108, and thereby, the amount of pressure the platens 206 exert on a laminate assembly 112.

Furthermore, each of the press components 106, 108 can remain fluid-tight boxes while the platens 206 move relative to the outer housings 204, and the press components 106, 108 expand and contract. For example, FIG. 2A illustrates that one or more implementations can include a sliding seal 220 between the inner housing 202 and the outer housing 204 of each press component 106, 108. The sliding seals 220 can prevent fluid from escaping or entering the press components 106, 108, while also allowing the platens 206 and inner housings 202 to move relative to the outer housings 204.

Alternatively, in place of the sliding seals 220, each of the press components 106, 108 can include a flexible bladder connecting the platens 206 to the outer housings 204. The flexible bladder can provide a seal between the platens 206 and the outer housings 204, and also allow the platens 206 to move toward or away from each other based on the fluid pressure within the upper and lower press components 106, 108.

In order to actuate the upper and lower press components 106, 108, a fluid actuator 116 (FIG. 1) can pump fluid through tubes (not shown) into one or more holes 230 formed in the upper and lower press components 106, 108. According to at least one implementation, the fluid can comprise a gas, vapor, or liquid. For example, the fluid can comprise an inert gas such as air or nitrogen. In such implementations, the fluid actuator 116 can comprise an air compressor or pump. In any event, the fluid actuator 116 can pressurize the upper and lower press components 106, 108 with fluid. The pressurization of the press components 106, 108 can distribute uniform or substantially uniform fluid pressure across the platens 206. One will appreciate in light of the disclosure herein that the uniform or substantially uniform distribution of fluid pressure across the platens 206 can minimize or eliminate warping and other damage common to conventional platens.

Additionally, as explained in greater detail below, the uniform or substantially uniform fluid pressure across the platens 206 can also reduce or eliminate the need for additional mechanisms to aid in distributing pressure from the platens 206 evenly or uniformly across the outer surfaces of a laminate assembly 112. The elimination of pressure pads, tooling plates, and similar mechanisms can speed up the heating and cooling rates of the press assembly 104, as it eliminates intermediate layers between the platens 206 and the laminate assembly 112. The increased heat transfer rates allow for reductions in processing time, power requirements, and otherwise increase the efficiency of the lamination process.

Figure 2B:
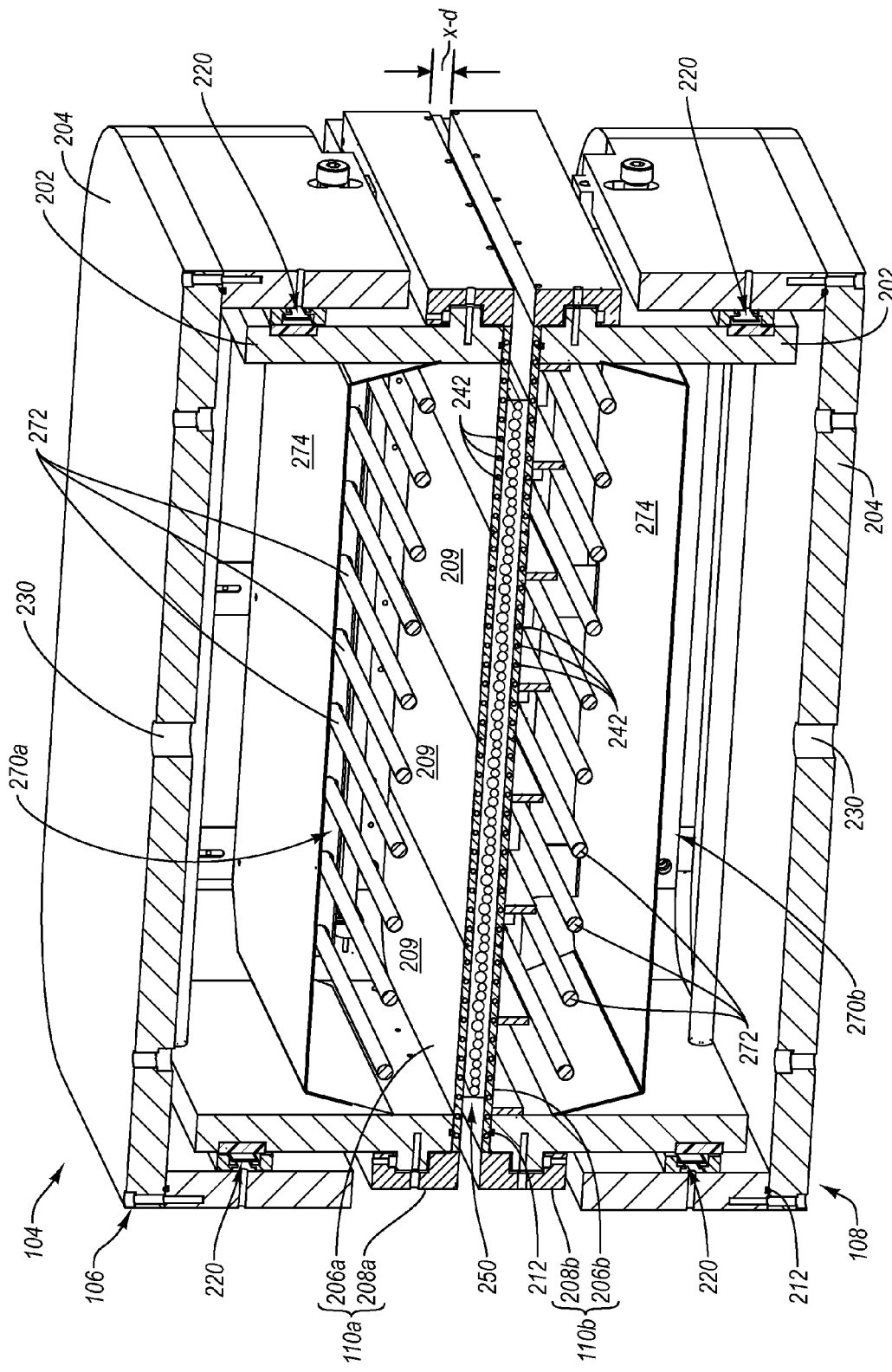
FIG. 2B illustrates a side perspective, cross-sectional view of a press assembly of the lamination press of FIG. 1 in an expanded configuration in accordance with an implementation of the present invention.

In any event, the fluid actuator 116 can increase or decrease the pressure within the press components 106, 108 to cause the one or more press components 106, 108 to expand or contract toward the other. For example, FIG. 2A illustrates the upper and lower press components 106, 108 in an un-actuated state where the upper and lower platen assemblies 110a, 110b are separated by a distance "x." In contrast, FIG. 2B illustrates the upper and lower press components 106, 108 are in an actuated state where the upper and lower platen assemblies 110a, 110b are separated by a distance of x-d. One will appreciate that the distance "d" can comprise a distance one or more of the upper and/or lower platen assemblies 110a, 110b move toward each other. One will appreciate that the press assembly 104 can form the unitary product 250 by applying heat and pressure to the laminate assembly 112, as explained in greater detail below.

As a preliminary step in forming a unitary product, a manufacturer can place a laminate assembly 112 on the second platen 206b. For example, FIG. 2A illustrates that a manufacturer can place a first resin layer 232 on the second platen 206b of the lower press component 108, a decorative image layer 234 on the first resin layer 232, and a second resin layer 236 over the decorative image layer 234 to form a laminate assembly 112. As mentioned previously, the decorative image layer 234 can comprise fabrics, paper, colored films, printed images, or three-dimensional objects. For example, FIG. 2A shows the decorative image later 234 in this case comprises a layer of thatch reed.

After having positioned laminate assembly 112 on the second platen 206b, the manufacturer can close the press assembly 104 over the laminate assembly 112. For example, FIG. 2A illustrates that the manufacturer can lower the upper press component 106 over the laminate assembly 112 until the first platen 206a is proximate, or abuts against, the upper layer 236 of the laminate assembly 112.

At this point the first and second radiant heating assemblies 270a, 270b can radiate the platens 206 to heat them to a desired temperature as explained in greater detail above. Alternatively, the first and second radiant heating assemblies 207a, 270b can preheat the platens 206 prior to, or while, the manufacturer is laying up the laminate assembly 112 on the second platen 206b. In yet further implementations of the present invention, the first and second radiant heating assemblies 270a, 270b can begin to heat the platens 206 as the fluid actuator 116 causes them to press against the laminate assembly 112.

In any event, and as the name implies, the fluid actuator 116 can fill the upper and lower press components 106, 108 with fluid. As the upper and lower press components 106, 108 are filled with fluid, uniform or substantially uniform fluid pressure can act upon the platens 206, which in turn can press the laminate assembly 112. As the fluid actuator 116 increases the pressure within the upper and lower press components 106, 108, the platens 206 can move relative to the outer housings 204, increasing the platen pressure on the laminate assembly 112. In particular, according to at least one implementation, one or more of the platens 206 can move a distance "d" from a contracted configuration (FIG. 2A) to an expanded configuration (FIG. 2B). The combination of the heat and pressure from the platens 206 can at least partially melt and form the resin layers 232, 236 of the laminate assembly 112 (FIG. 2A) together to form the unitary product 250 or panel (FIG. 2B).

As mentioned previously, one or more implementations can also or alternatively include flexible platens. As used herein the term "flexible platen" means a platen formed from a material that is at least partially rigid, but that can also reversibly flex, bend, or deflect in small degrees in one or more directions in response to applied pressure. For example, a flexible platen according to at least one implementation includes at least a portion that can flex or bend away from a planar configuration. For example, FIGS. 2A and 2B illustrate that each of the platens 206 can comprise a relatively thin sheet, such as a sheet of aluminum (or similarly conductive and/or flexible metal or composite). Additionally, FIGS. 2A and 2B illustrate that the platens 206 can include a plurality of coupled platen extensions 209, which can flex or bend relative to each other in or out of a planar configuration.

One will appreciate in light of the disclosure herein that the fluid pressure generated by the fluid actuator 116 can work in tandem with the flexibility of the platens 206 to help ensure a uniform or substantially uniform distribution of pressure across a laminate assembly 112. For example, as the fluid actuator 116 pressurizes the press components 106, 108 with fluid, the fluid pressure acting on the platens 206 can cause the platens 206 to flex, bend, or deflect in small amounts about the laminate assembly 112, and thus enable the platens 260 to conform to any corresponding imperfections or contours in the laminate assembly 112. Thus, the platens 206 of at least one implementation can perform a similar function and replace conventional pressure pads and tooling plates. As discussed herein above, the elimination of pressure pads and tooling plates can increase press processing speed, and otherwise increase the efficiency of a lamination process.

Additionally, the ability of the platens 206a to flex can allow the platens 206 to adjust or compensate for the processing of non-planar or otherwise contoured materials, such as non-planar (or imperfectly planar) lamination materials. In particular, the platens 206 can flex about laminate assemblies that comprise larger three-dimensional objects, such as the larger pieces of thatch of the image layer 234, to prevent portions of the decorative image layer from receiving a disproportionate amount of the platen pressure generated by the press assembly 104. Also, the flexibility of the platens 206 can help eliminate or reduce air pockets and air bubbles in a resulting unitary product 250. In particular, by adjusting and flexing as the layers of a laminate assembly 112 melt and form together, the platens 206 can help push or force air bubbles out from in between the layers of the laminate assembly 112 as the platens 206 apply pressure to the laminate assembly 112.

According to one or more implementations of the present invention the flexibility of the platens 206 can also allow for the production of a smooth and flat final product 250. For example, in at least one implementation, the fluid actuator 116 can create a vacuum within the press components 106, 108 that withdraws the platens 206 into the inner housings 202. As the fluid actuator 116 increases the fluid pressure within the press components 106, 108, the fluid pressure can force the platens 206 out of the inner housings 202 and against the laminate assembly 112. As fluid pressure forces the heated platens 206 against the laminate assembly 112, the flexible, yet rigid platens 206a can flatten and smooth out the laminate assembly 112 to create a smooth, unitary product 250 of substantially uniform gauge.

Figure 4:
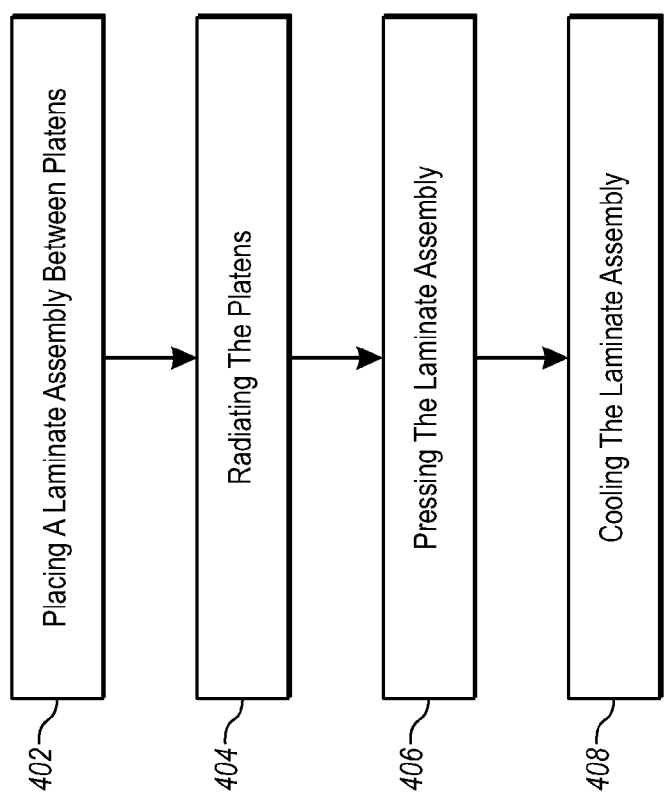
FIG. 4 illustrates a flowchart of a series of acts in a method in accordance with an implementation of the present invention of rapidly and uniformly heating a laminate assembly with radiation to form a unitary product.

Accordingly, FIGS. 1-3, and the corresponding text, provide a number of different components and mechanisms for forming a structurally sound resin panel in a rapid and efficient manner. In addition to the foregoing, implementations of the present invention can also be described in terms one or more acts in a method for accomplishing a particular result. For example, FIG. 4 illustrates a flowchart of one exemplary method for rapidly and uniformly heating a laminate assembly with radiation to form a unitary product in accordance with the one or more principles of the present invention. The acts of FIG. 4 are described below with reference to the components and diagrams of FIGS. 1 through 3.

For example, FIG. 4 shows that the method of forming a decorative architectural resin panel can comprise an act 402 of placing a laminate assembly between platens. Act 402 can involve placing a laminate assembly between opposing platens. For example, FIG. 2A shows that a manufacturer has positioned the laminate assembly 112 between opposing platens 206a, 206b.

In addition, FIG. 4 shows that a method in accordance with an implementation of the present invention can comprise an act 404 of radiating the platens. Act 404 can involve radiating the opposing platens with heat, thereby uniformly heating the laminate assembly. For example, FIG. 2A illustrates that a plurality of halogen lamps 272 can emit energy through radiation, or radiant heating, which is then absorbed by the platens 206 and transferred to a laminate assembly 112. In such implementations of the present invention, the radiation emitted by the halogen lamps 272 can uniformly or substantially uniformly heat the platens 206 in a rapid, yet precise manner.

In any event, act 404 can involve heating the laminate assembly 112 without having to transfer heat through pressure pads or tooling plates. For example, FIGS. 2A and 2B illustrate that heat can transfer directly from the platens 206 to the laminate assembly 112 without having to pass through any intermediate layers. In one or more alternative implementations of the present invention, the heat form the platens 206 may pass through a caul plate, release paper, or texture paper prior to transferring to the laminate assembly 112. In either case, the platens 206 can rapidly and effectively heat the laminate assembly 112. For example, the entire heating of act 404 can comprise eight minutes or less according to one or more implementations of the present invention.

FIG. 4 also shows that a method in accordance with an implementation of the present invention can comprise an act 406 of pressing the laminate assembly. Act 406 can involve actuating one or more of the opposing platens to uniformly press the laminate assembly between the opposing platens. For example, FIGS. 2A-2B illustrate that a fluid actuator 116 (FIG. 1) can pump fluid through tubes (not shown) into one or more holes 230 formed in upper and lower press components 106, 108. As fluid fills the upper and lower press components 106, 108, the platens 206 can apply uniform or substantially uniform pressure across the layers of the laminate assembly 112.

In one or more implementations of the present invention, act 406 can also involve applying substantially uniform pressure across at least a majority of one or more of the opposing platens. For instance, FIGS. 2A and 2B illustrate that the fluid actuator 116 can increase the fluid pressure within the upper and lower press components 106, 108, thereby, exerting substantially uniform pressure across at least a majority of one or more of the opposing first and second platens 206a, 206b. One will appreciate in light of the disclosure therein that the fluid pressure can cause one or more of the first platen 206a and the second platen 206b to move away from the upper housings 204 toward the other corresponding platen 206.

In one or more implementations, act 406 can further involve one or more of the platens 206 flexing about one or more contours in the one or more surfaces of the laminate assembly. Act 406 can involve applying substantially uniform fluid pressure across a flexible platen causing the platen to form, at least partially, with the contours of resin sheets as they melt and form together. For example, the fluid actuator 116 can pressurize the press components 106, 108, causing thin, aluminum platens 206 to flex or bend in small degrees. Additionally, or alternatively, one or more platen extensions 306 of the platens 206 can pivot or flex, thereby applying substantially uniform pressure across outer surfaces 232, 236 of the laminate assembly 112.

Furthermore, FIG. 4 shows that the method can comprise an act 408 of cooling the laminate assembly. Act 408 can involve cooling the opposing platens by pumping a cooling medium through a plurality of fluid channels formed within the opposing platens. For example, FIG. 2A shows that a cooling source 118 (FIG. 1) can pump a cooling medium (water, air, or other cooled fluids) through the fluid channels 242 formed in the platens 206. In at least one implementation, the cooling source 118 can pass the cooling medium in both directions across the platens 206. For example, the cooling source 118 can pump a cooling medium through one half of the fluid channels 242 in a first direction, and can pump a cooling medium through the other half of the fluid channels 242 in a second opposing direction.

One will appreciate that one or more apparatus and systems of the present invention can allow for the lamination of resin panels at speeds unattainable using conventional lamination presses and methods. For example, according to one or more implementations, a lamination press can laminate one or more resin sheets having a thickness of between about ⅛ inch and about 1 inch together, or to a decorative image layer, in about 5 to about 20 minutes. The processing time of between about 5 to about 20 minutes can include a complete cycle, i.e., heating the platens 206, subjecting the laminate assembly to heat and pressure, and cooling the laminate assembly under pressure. The processing time of between about 5 minutes to about 20 minutes can be significantly less than the time required to heat the platens of a conventional press to the necessary processing temperature, let alone heating and cooling the laminate assembly.

Additionally, one or more implementations can involve laminating one or more resin sheets having a thickness of between about ¼ inch and about ½ inch together, or to a decorative image layer, in about 5 to about 15 minutes. Yet further implementations of the present invention can involve laminating one or more resin sheets having a thickness of about ¼ inch together, or to a decorative image layer, in about 7 to about 12 minutes. The reduced processing times can allow for greater production at less cost and otherwise increase the efficiency of a lamination process.

In addition to rapid processing, one or more lamination presses of the present invention can process resin panels at unexpectedly and surprising low pressures. For example, conventional lamination processes typically require a minimum pressure of at least about 90 psi to form decorative, architectural resin panels. One or more the lamination presses of the present invention, however, can form decorative, architectural resin panels with excellent structural properties using maximum pressures of about 40 psi or less, typically in a single step. For example, one or more implementations of the present invention can laminate one or more resin sheets having a thickness of between about ⅛ inch and about 1 inch together, or to a decorative image layer, using pressures of between about 5 psi and about 40 psi. In one or more implementations, the pressures can comprise about 10 psi to about 25 psi. In yet further implementations, the pressures can comprise about 15 psi to about 25 psi.

One will appreciate that such small pressures can provide a number of advantages. For example, the smaller processing pressures can allow for a lamination press to embed delicate decorative image layers between resin sheets without damaging the image layers. Furthermore, the lower pressures can allow for a less robust lamination press, and less stress to the various manufacturing materials and apparatus.

Surprisingly, one or more lamination press of the present invention can process resin panels at the low pressures mention above, while also heating the resin materials at approximately the same temperatures as conventional lamination processes. For example, in at least one implementation, a lamination press can laminate one or more resin sheets having a thickness of between about ⅛ inch and about 1 inch together, or to a decorative image layer, using pressures of between about 5 psi and about 40 psi, while heating the one or more resin sheets to a temperature of between about 220 degrees Fahrenheit and about 350 degrees Fahrenheit.

Figure 5:
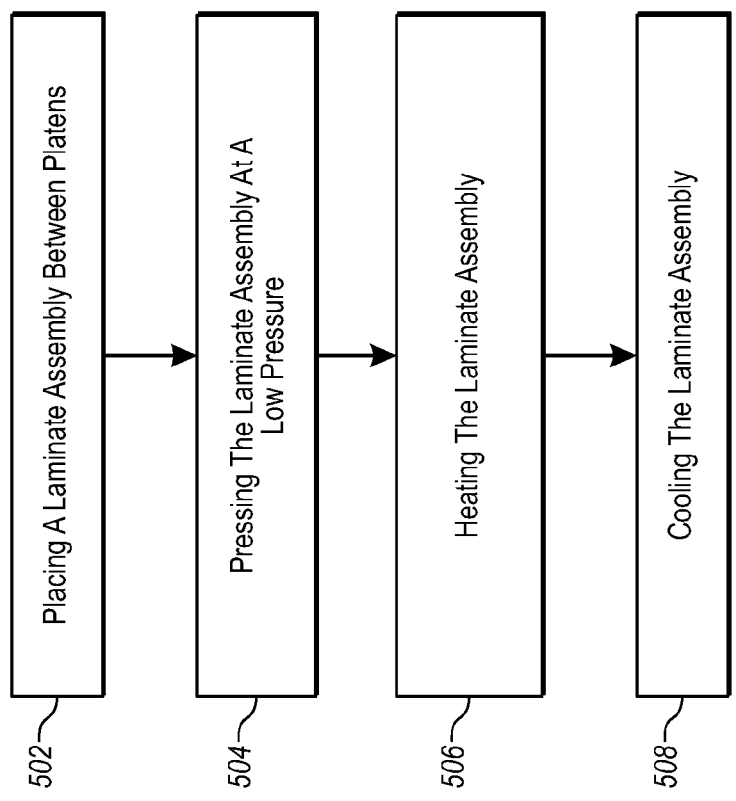
FIG. 5 illustrates a flowchart of a series of acts in a method in accordance with an implementation of the present invention of rapidly forming a decorative architectural resin panel at low pressures.

For example, FIG. 5 illustrates a flowchart of one exemplary method of rapidly forming a decorative architectural resin panel at low pressures in accordance with the one or more principles of the present invention. The acts of FIG. 5 are described below with reference to the components and diagrams of FIGS. 1 through 3.

For example, FIG. 5 shows that the method of forming a decorative architectural resin panel can comprise an act 502 of placing a laminate assembly between platens. Act 502 can involve positioning a laminate assembly within a lamination press. For example, FIG. 2A shows that a manufacturer has positioned an assembled laminate assembly 112 including a decorative image layer 234 on a first resin sheet 232, and a second resin sheet 236 on or about the decorative image layer 234 between the opposing platens 206a, 206b of the lamination press 100.

One will appreciate that act 502 can involve positioning one or more resin sheets 232, 234 having dimensions of between about ⅛ inch and about 1 inch into a lamination press. Additionally, act 502 can involve positioning resin sheets 232, 234 having lengths between about 6 inches and about 5 feet, and widths of between about 6 inches and about 10 feet. Thus, the method described in relation to FIG. 5 can involve forming resin panels configured for use as building materials in architectural applications.

FIG. 5 also shows that a method in accordance with an implementation of the present invention can comprise an act 504 of pressing the laminate assembly at a low pressure. Act 504 can involve applying continuous pressure of between about 5 pounds per square inch and about 40 pounds per square inch to the laminate assembly. For example, FIGS. 2A-2B illustrate that a fluid actuator 116 (FIG. 1) can pump fluid through tubes (not shown) into one or more holes 230 formed in upper and lower press components 106, 108. As fluid fills the upper and lower press components 106, 108, the platens 206 can apply uniform or substantially uniform pressure across the layers of the laminate assembly 112, pressing them together.

In one or more implementations, act 504 can involve applying a pressure of between about 10 pounds per square inch and about 25 pounds per square inch to the laminate assembly. Additionally, act 504 can involve applying a pressure of between about 15 pounds per square inch and about 20 pounds per square inch to the laminate assembly. One will appreciate that in at least one implementation of the present invention the pressures described in relation to act 504 can be the maximum pressures applied to the laminate assembly during the lamination process.

In addition, FIG. 5 shows that a method in accordance with an implementation of the present invention can comprise an act 506 of heating the laminate assembly. Act 506 can involve heating the laminate assembly at a desired temperature while maintaining the continuous pressure to at least partially melt and form one or more resin sheets of the laminate assembly as a substantially unitary resin panel structure. For example, FIG. 2A illustrates that a plurality of lamps 272 (e.g., halogen lamps) can emit energy through radiation, which is then absorbed by the platens 206 and transferred to a laminate assembly 112 as the platens 206 are being pressed against the laminate assembly 112. In such implementations of the present invention, the radiation emitted by the halogen lamps 272 can uniformly or substantially uniformly heat the platens 206 in a rapid, yet precise manner.

Additionally, act 506 can involve heating the laminate assembly to a desired temperature of between about 220 degrees Fahrenheit and about 350 degrees Fahrenheit or to higher or lower pressures. In so doing, act 506 can involve heating the platens 206 to a temperature of between about 220 degrees Fahrenheit and about 480 degrees Fahrenheit, or between about 230 degrees Fahrenheit and about 400 degrees Fahrenheit, or about 230 degrees Fahrenheit and about 350 degrees Fahrenheit or to higher or lower temperatures.

Act 506 can involve spiking the temperature of the platens 206 to a temperature significantly above the desired temperature of the laminate assembly to quickly bring the laminate assembly to the desired temperature. Act 506 can then involve lowering or moderating the temperature of the platens 206 (e.g., turning off or lowering the energy emitted by the radiant heating elements) to help ensure that the temperature of the laminate assembly does not rise significantly over the desired temperature. For example, when it is desired to heat a laminate assembly at around 230 degrees Fahrenheit, act 506 can involve spiking the temperature of the plates 206 to between 300 and 480 degrees Fahrenheit. This can rapidly heat the laminate assembly to near the desired temperature. Act 506 can then involve turning off or lowering the heat to the platens 206, thereby, allowing the heat to "soak" into the laminate assembly without raising the laminate assembly significantly above the desired temperature.

Furthermore, FIG. 5 shows that the method can comprise an act 508 of cooling the laminate assembly. Act 508 can involve cooling the laminate assembly while maintaining the continuous pressure. For example, referring to FIG. 2A, a cooling source 118 (FIG. 1) can pump a cooling medium (water, air, or other cooled fluids) through the fluid channels 242 formed in the platens 206, while the platens 206 are actuated against the laminate assembly. Thus, the method of FIG. 5 can involve heating and cooling the laminate assembly without releasing (i.e., bumping the press) the pressure from the laminate assembly.

Furthermore, the entire set of acts in the method of FIG. 5 (i.e., applying continuous pressure, heating, and cooling the laminate assembly) can comprise between about 5 minutes and about 20 minutes. In at least one implementation, the entire method of FIG. 5 can comprise between about 5 minutes and about 15 minutes. In one or more implementations, the entire method of FIG. 5 can comprise between about 7 minutes and about 12 minutes.

Accordingly, the schematics and methods described herein can provide a number of ways for creating aesthetically pleasing, decorative, architecturally-suitable resin-based panels. Furthermore, these resin panels can be substantially translucent or transparent in order to provide a desired aesthetic. Still further, the implementations of the present invention provide methods of creating decorative, architecturally-suitable resin-based panels without damaging the panels during processing.

In particular, implementations of the present invention can create structurally useful panels with excellent aesthetic characteristics, which have no bowing, warping, or edge rollover, since they are created in a manner that avoids non-uniform temperature and pressure gradients. This can be accomplished by applying heat and pressure uniformly and simultaneously to opposing sides of a laminate assembly, and ensuring that each surface has equal exposure to any heat sources.

In addition, one will recognize in light of the disclosure herein that using a single press for heating and cooling can eliminate the need for a conveyer to transport the resin lamination material between different component presses, and eliminates the time required to do so. When combined with the aforementioned heating abilities, one or more presses of the present invention can complete a heating and cooling cycle in as little as ten minutes. Additionally, two personnel, instead of the six to eight personnel generally required by conventional presses, can process a product.

Notably, one or more implementations of the present invention also reduce energy waste. The heating assembly can apply energy to the platen assembly only when heat is required during a lamination process. Thus, no energy is wasted by heating the press between jobs. Furthermore, one or more implementations of the present invention can apply uniform or substantially uniform pressure to a laminate assembly without the use of pressure pads or tooling plates, no energy is wasted through such intermediate layers.

Furthermore, the present invention may be embodied in other specific forms without departing from its spirit or essential characteristics. For example, in addition to the foregoing, one will appreciate that panels made in accordance with the present invention can be formed to a wide variety of shapes and dimensions. In addition, the structures and processes described herein can be deviated in any number of ways within the context of implementations of the present invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A lamination press configured to rapidly heat and precisely control the temperature of a laminate assembly, comprising:
    first and second platens each including a plurality of enclosed fluid channels extending there through, wherein each of the first and second platens have a thickness of between about ⅛ inch and about ½ inch;
    one or more materials configured to aid in the diffusion of heat within the first and second platens; and
    an actuator configured to press the first and second platens toward each other;
    wherein at least one the first or second platens comprises a plurality of flexibly coupled platen extensions configured so that adjacent platen extensions in the plurality can flex relative to each other in or out of a planar configuration with applied pressure.

2. The lamination press as recited in claim 1, wherein the heat source comprises one or more radiant heating assemblies.

3. The lamination press as recited in claim 1, wherein the first and second platens comprise aluminum.

4. The lamination press as recited in claim 1, further comprising a highly absorptive material coated upon one or more of the first and second platens.

5. The lamination press as recited in claim 1, wherein the actuator comprises an air compressor or a pump configured to apply substantially uniform fluid pressure across one or more of the first and second platens.

6. A press component for use in an efficient lamination press configured to rapidly heat and uniformly press a laminate resin assembly to form a decorative architectural resin structure, comprising:
    a fluid-tight enclosure comprising an outer housing, flexible bladder, and a platen having a plurality of platen extensions flexibly coupled together, the plurality of platen extensions having a plurality of enclosed fluid channels;
    wherein:
    the flexible bladder connects the platen to the outer housing and allows the platen to move based on the fluid pressure within the fluid-tight enclosure;
    the plurality of flexibly coupled platen extensions of the platen is configured to flex by pivoting between each platen extension upon pressurization of the fluid-tight enclosure; and
    the press component is configured to oppose another press component for use in the lamination press, wherein the press component and other press component are configured to provide opposing pressure to opposing surfaces of the laminate resin assembly.

7. The press component as recited in claim 6, wherein the platen comprises aluminum.

8. The press component as recited in claim 6, wherein the platen comprises a flexible material having a high thermal conductivity.

9. A method for rapidly and uniformly heating a laminate assembly with radiation to form a unitary product comprising:
    placing a laminate assembly between opposing platens;
    uniformly heating the opposing platens with one or more heat sources;
    actuating one or more of the opposing platens to uniformly press the laminate assembly between the opposing platens, wherein each opposing platen comprises a plurality of flexibly joined platen extensions that flex and pivot relative to each other upon contact with a surface of the laminate assembly; and
    cooling the opposing platens by pumping a cooling medium through a plurality of fluid channels formed within the opposing platens.

10. The method as recited in claim 9, wherein heating the opposing platens comprises radiating the opposing platens with one or more halogen lamps.

11. The method as recited in claim 9, further comprising regulating the air pressure within one or more press components to adjust the pressure applied to the laminate assembly.

12. The method as recited in claim 9, further comprising:
    applying substantially uniform pressure across at least a majority of one or more of the opposing platens of the laminate assembly;
    wherein the platen extensions of the one or more of the opposing platens flex about one or more contours in the one or more surfaces of the laminate assembly.

13. A method of rapidly forming a decorative architectural resin panel in a lamination press at low pressures, comprising:
    positioning a laminate assembly within a lamination press;
    applying continuous pressure of between about 5 pounds per square inch and about 40 pounds per square inch to the laminate assembly, wherein pressure is applied through a plurality of flexibly joined platen extensions that conform to one or more contours in the laminate assembly;
    heating the laminate assembly at a desired temperature while maintaining the continuous pressure to at least partially melt and form one or more resin sheets of the laminate assembly as a substantially unitary resin panel structure;

cooling the unitary resin panel while maintaining the continuous pressure; and withdrawing at least one of the opposing platens from the laminate assembly, wherein the plurality of platen extensions of the withdrawn platen revert to a substantially planar conformation when no longer contacting the laminate assembly.

14. The method as recited in claim 13, further wherein the applying continuous pressure comprises applying between about 15 pounds per square inch and about 20 pounds per square inch to the laminate assembly.

15. The method as recited in claim 13, further comprising heating one or more platens to a temperature of between about 230 degrees Fahrenheit and about 400 degrees Fahrenheit.

16. The method as recited in claim 15, wherein heating the one or more platens comprises radiating the one or more platens with one or more radiant heating elements.

17. The method as recited in claim 13, wherein the process of applying continuous pressure, heating, and cooling the laminate assembly comprises between about 5 minutes and about 15 minutes.

18. The method as recited in claim 13, wherein the one or more resin layers comprises a resin sheet having a thickness of between about ⅛ inch and about 1 inch.

19. The method as recited in claim 13, further comprising rapidly raising the temperature of one or more platens to temperature higher than the desired temperature to rapidly heat the laminate assembly and then rapidly reducing the temperature of the platens to maintain the laminate assembly at approximately the desired temperature.

* * * * *